United States Patent
O'Neill et al.

(10) Patent No.: US 8,418,671 B2
(45) Date of Patent: Apr. 16, 2013

(54) MAGNETORHEOLOGICAL LUBRICATION OF AN INTERNAL COMBUSTION ENGINE

(71) Applicant: Ford Global Technologies, LLC, Dearborn, MI (US)

(72) Inventors: Jonathan Terence Joseph O'Neill, Erith (GB); Ian Grahem Pegg, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/664,454

(22) Filed: Oct. 31, 2012

(65) Prior Publication Data

US 2013/0047952 A1    Feb. 28, 2013

Related U.S. Application Data

(62) Division of application No. 12/711,443, filed on Feb. 24, 2010, now Pat. No. 8,336,516.

(30) Foreign Application Priority Data

Mar. 5, 2009  (GB) .................................. 0903800.1

(51) Int. Cl.
*F01M 1/02* (2006.01)

(52) U.S. Cl.
USPC .......................... 123/196 R; 384/99; 384/133

(58) Field of Classification Search ............... 123/1 A, 123/1 R, 196 R; 384/133, 99; *F16C 27/00*
See application file for complete search history.

(56) References Cited

U.S. PATENT DOCUMENTS

| | | | | | |
|---|---|---|---|---|---|
| 5,305,717 | A | * | 4/1994 | Wichelhaus | 123/90.17 |
| 5,452,957 | A | * | 9/1995 | Duggan | 384/99 |
| 5,715,785 | A | * | 2/1998 | Gregg, Jr. | 123/196 R |
| 6,883,967 | B2 | * | 4/2005 | Robb et al. | 384/536 |

FOREIGN PATENT DOCUMENTS

JP    03024316 A * 2/1991

* cited by examiner

*Primary Examiner* — Noah Kamen
*Assistant Examiner* — Hung Q Nguyen

(57) ABSTRACT

A system and method are disclosed for reducing the fuel consumption of an engine, particularly during a cold start or an engine warm-up period. A magnetorheological fluid having a low viscosity is used to lubricate the engine. When viscosity is to be increased, a magnetic field is applied to the magnetorheological fluid. The magnetic field can be selectively applied to electromagnets proximate engine bearings.

10 Claims, 5 Drawing Sheets

MAGNETORHEOLOGICAL LUBRICATION OF AN INTERNAL COMBUSTION ENGINE

CROSS-REFERENCE TO RELATED APPLICATIONS

This is a divisional of, and claims the benefit of the filing date of, copending application Ser. No. 12/711,443 filed Feb. 24, 2010 which claims foreign priority benefits under 35 U.S.C. §119(a)-(d) to GB 0903800.1 filed Mar. 5, 2009, which is hereby incorporated by reference in its entirety.

BACKGROUND

1. Technical Field

This invention relates to internal combustion engines and in particular engines using a magnetorheological lubricant.

2. Background Art

It is generally desirable to reduce the fuel consumption of an engine to reduce the running costs of the engine and the emissions from the engine. The emissions from an engine are closely related to the volume of fuel consumed by the engine and this is particularly so in the case of $CO_2$ emissions. Two major factors affecting fuel economy are: 1) Cold Start Cranking (CSC); and 2) Engine Warm Up (EWU).

For CSC, the starter motor is normally required to rotate an engine with cold, thick, viscous engine oil combined with un-lubricated, and hence, high-friction internal engine components. Both the aforementioned issues provide an increased inertia for the starter motor directly putting an additional drain upon the vehicle's battery. The battery charge is replenished via the alternator, when the engine has started, but at a cost to fuel economy.

For EWU, once the engine has started, the engine is once again required to work harder to overcome the cold and viscous engine oil until optimum engine operating temperatures and related low oil viscosity is achieved. During EWU, extra fuel is consumed to compensate for higher frictional losses at a further cost to fuel economy.

In a traditional engine, the effects of thick, viscous oil and un-lubricated internal engine components are not uniform throughout the engine. For example, the crankshaft main bearings will have a higher and significant friction drain when compared to the camshaft bearings.

Reducing the viscosity of a conventional lubricant used to lubricate an engine reduces fuel consumption due to reduced frictional losses and a reduction in the power required to pump the lubricant through the engine. However, lubricants having a very low viscosity at ambient temperature have even lower viscosity as temperature increases. Although this reduction in viscosity with temperature is beneficial to fuel economy, there is a limit to how low the viscosity can go before the lubricating film breaks down at high temperatures and load with potentially serious consequences such as increased bearing wear and very high levels of friction. It is therefore normal practice to use a lubricant that is sufficiently viscous at high temperature to resist film breakdown and accept the increased and undesirable higher friction and high pumping losses at lower temperatures that will result from the use of oil that is more viscous than is desirable at ambient temperature.

SUMMARY

According to an embodiment of the disclosure, there is provided a method including using a magnetorheological fluid to lubricate the engine and applying a magnetic field to the magnetorheological fluid to change the viscosity of the magnetorheological fluid based upon engine operating conditions. The magnetorheological fluid is not to be confused with an electrorheological fluid or a ferrofluid.

The engine operating conditions may include at least one of a temperature associated with the engine, a rotational speed of the engine, and engine torque.

Applying a magnetic field to the magnetorheological fluid to change the viscosity of the magnetorheological fluid may include applying a magnetic field at one or more specific locations so as to locally change the viscosity of the magnetorheological fluid. Furthermore, the strength of the magnetic field at one specific location may be changed independently of the strength of the magnetic field at another specific location.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated and described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

Figure 1:
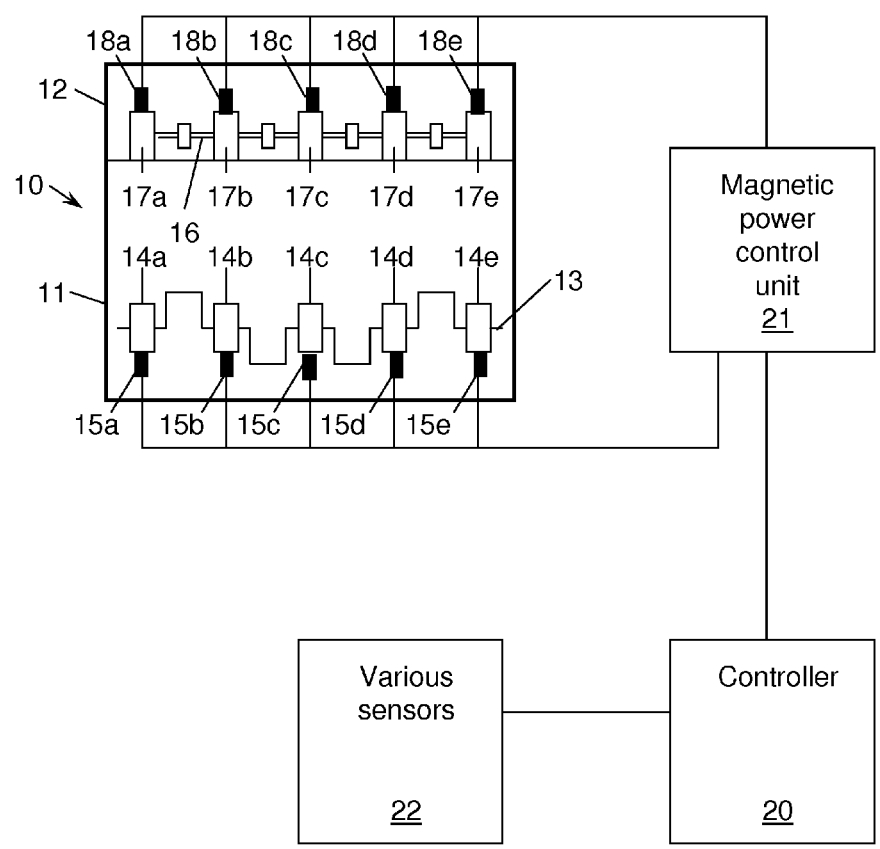
FIG. 1 is a schematic block diagram of an engine system according to an embodiment of the disclosure.

Referring to FIG. 1 there is shown an engine system including an engine 10 having a cylinder block 11 and a cylinder head 12.

The engine block 11 rotatably supports, by a number of main bearings 14a, 14b, 14c, 14d and 14e, a crankshaft 13 to which a number of pistons (not shown) are connected by connecting rods (not shown) in a conventional manner. Each of main bearings 14a, 14b, 14c, 14d and 14e has an electromagnet 15a, 15b, 15c, 15d and 15e associated with it. The electromagnets 15a, 15b, 15c, 15d and 15e are arranged to produce a magnetic field that interacts with the lubricant located in the respective main bearing 14a, 14b, 14c, 14d and 14e with which it is associated.

Cylinder head 12 supports a camshaft 16 by a number of spaced apart camshaft bearings 18a, 18b, 18c, 18d and 18e. As is well known in the art, camshaft 16 has a number of cams that are operable to selectively open inlet and exhaust valves of engine 10. Each of camshaft bearings 17a, 17b, 17c, 17d and 17e has an electromagnet 18a, 18b, 18c, 18d and 18e associated with it arranged to produce a magnetic field that interacts with the lubricant located in the respective camshaft bearing 17a to 17e with which it is associated.

Electromagnets 15a to 15e and electromagnets 18a to 18e are connected to a magnet power control unit 21, the function of which is to supply power to electromagnets 15a to 15e and 18a to 18e so as to cause each of the electromagnets to produce a magnetic field.

Each of electromagnets 15a to 15e and electromagnets 18a to 18e may include a single electromagnet or a number of electromagnets of the same size or of differing sizes. In addition, all of electromagnets 15a to 15e and electromagnets 18a to 18e can be individually switched or controlled or arranged in groupings. For example, electromagnets 15a and 15e associated with the first and fifth crankshaft main bearings 14a and 14e may form one group and electromagnets 15b, 15c and 15d associated with the second, third and fourth crankshaft main bearings 14b, 14c and 14d may form a further group that can be controlled or switched independently.

It will also be appreciated that although the disclosure is described with reference to its use for bearings associated with crankshaft 13 and camshaft 16 of engine 10, it could be applied to any bearing on engine 10 which receives a pressurized oil supply to reduce friction and wear, such as, for example and without limitation, the bearings for a balance shaft, oil pump bearings, and ancillary devices receiving a pressurised oil supply.

The magnet power control unit 21 is connected to a controller 20 which in the case of a motor vehicle may be a powertrain control module (PCM).

Controller 20 is arranged to receive a number of inputs from various sensors shown generally at reference number 22. These sensors may include, for example and without limitation, a measurement of engine temperature from at least one of an engine coolant temperature sensor, a cylinder head temperature sensor, and a cylinder block temperature sensor; a crankshaft position sensor giving an indication of engine speed (RPM); a throttle position sensor; a mass air flow sensor; and a manifold absolute pressure sensor. These sensors are used by controller 20 to determine the temperature of the engine, the speed of the engine, and the torque produced by engine 10.

To lubricate the various bearing of engine 10, a magnetorheological fluid is used as the lubricant for engine 10. This magnetorheological fluid is chosen so as to have a very low viscosity at normal ambient temperature thereby significantly reducing the energy required to pump it through engine 10 and also reducing the friction produced in the bearings of engine 10. However, when a magnetic field is applied to the magnetorheological fluid, its viscosity is increased thereby enabling the viscosity of the lubricant to be changed to suit operating conditions rather than viscosity being dependent upon operating conditions such as temperature.

Figure 5:
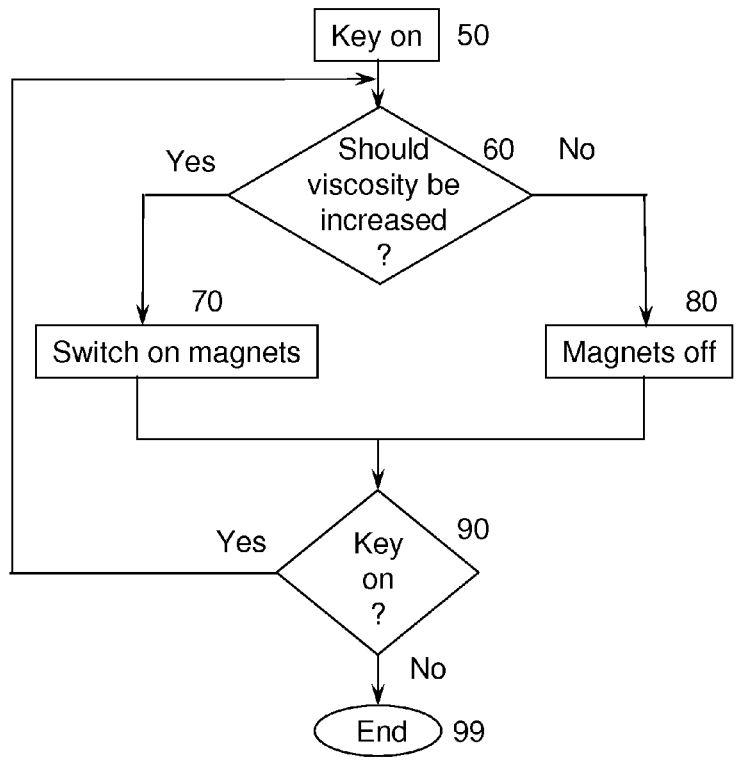
FIG. 5 is a high level flow chart of a method according to an embodiment of the disclosure.

Operation of controller 20 and its contribution to the engine system will now be described with reference to FIG. 1 in conjunction with FIG. 5 in which it is assumed that engine 10 is fitted to a motor vehicle having an ignition key or vehicle systems on/off device controlled by a driver of the vehicle. In the case of a hybrid vehicle, controller 20 may, in addition, be connected to a stop-start controller such that operation of magnet control is suspended when the stop-start controller stops engine 10 and resumes operation of magnet control when engine 10 is automatically restarted by the stop-start controller.

After the key is moved to an 'on' position, as indicated in block 50, controller 20 determines in block 60, with reference to the inputs it is receiving from sensors 22, whether there is an indication whether the viscosity of the magnetorheological fluid is to be increased. At room temperature, the viscosity of the magnetorheological fluid is very low. Thus, when the temperature of engine 10 increases, and particularly when engine 10 is hot and operating under high load, the viscosity of the magnetorheological fluid is increased.

Therefore, if the answer to the question posed in block 60 is 'yes', electromagnets 15a to 15e and 18a to 18e are energized either independently or as one or more groups by controller 20 sending a 'power on' signal to magnet power control unit 21 as indicated in block 70. Magnet power control unit 21 then supplies electrical power to electromagnets 15a to 15e and 18a to 18e from a power source (not shown). Alternatively, if the answer to the question posed in block 60 is 'no', electromagnets 15a to 15e and 18a to 18e are not energized by the controller 20 and controller 20 sends a 'power off' signal to magnet power control unit 21 as indicated by block 80.

It will be appreciated that magnet power control unit 21 could be formed as part of controller 20. In some embodiments, the high current switching components used to switch on and off electromagnets 15a to 15e and 18a to 18e is kept separate from the micro-electronic components of controller 20 so as to reduce interference therebetween.

After either of blocks 70 or 80, controller 20 confirms in block 90 whether the key is still on. If it is, controller 20 reverts to rechecking whether the viscosity is to be increased in block 60. If the key has been turned off, the control passes to block 99.

Figure 2:
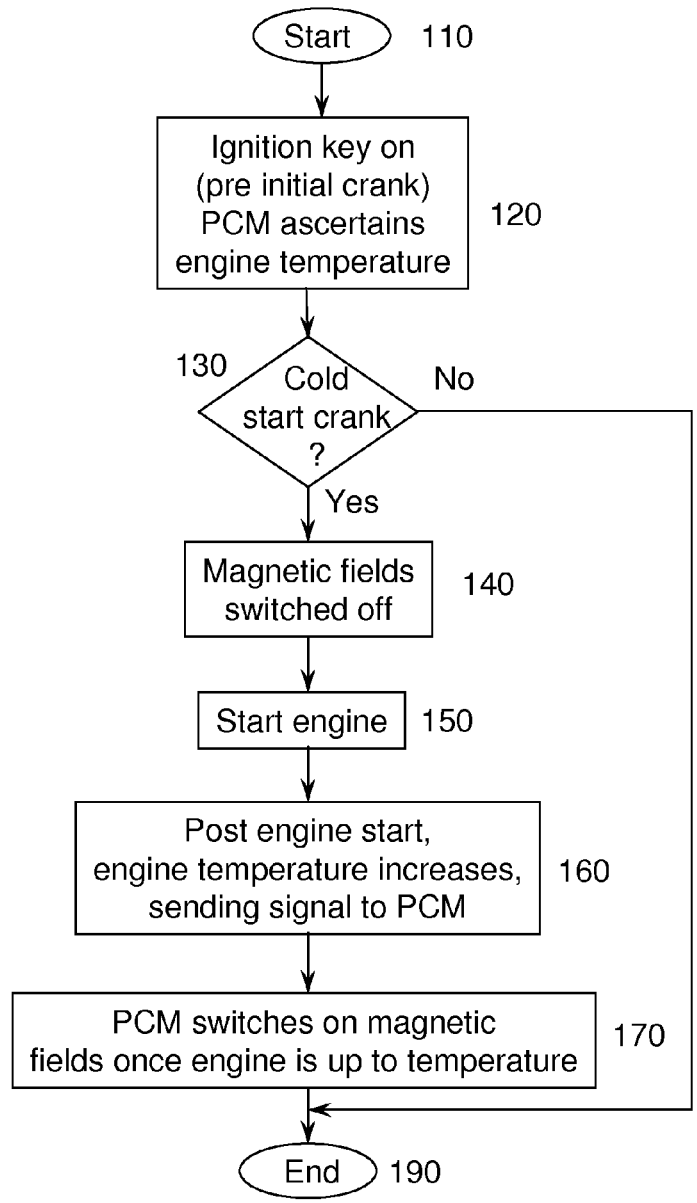
FIG. 2 is a flow chart of a method for operating an engine according an embodiment of the disclosure.

Referring now to FIG. 2, an alternative embodiment starts in block 110. In block 120, a key-on event occurs, after which, controller 20 determines from sensors 22 and, in particular from an engine temperature sensor, the temperature of engine 10. In block 130, it is determined whether a cold start is to be performed. This is based upon whether the temperature of the engine, determined in block 120, is below a first predetermined temperature. If it is below the first predetermined temperature, the start is a cold start.

Figure 3:
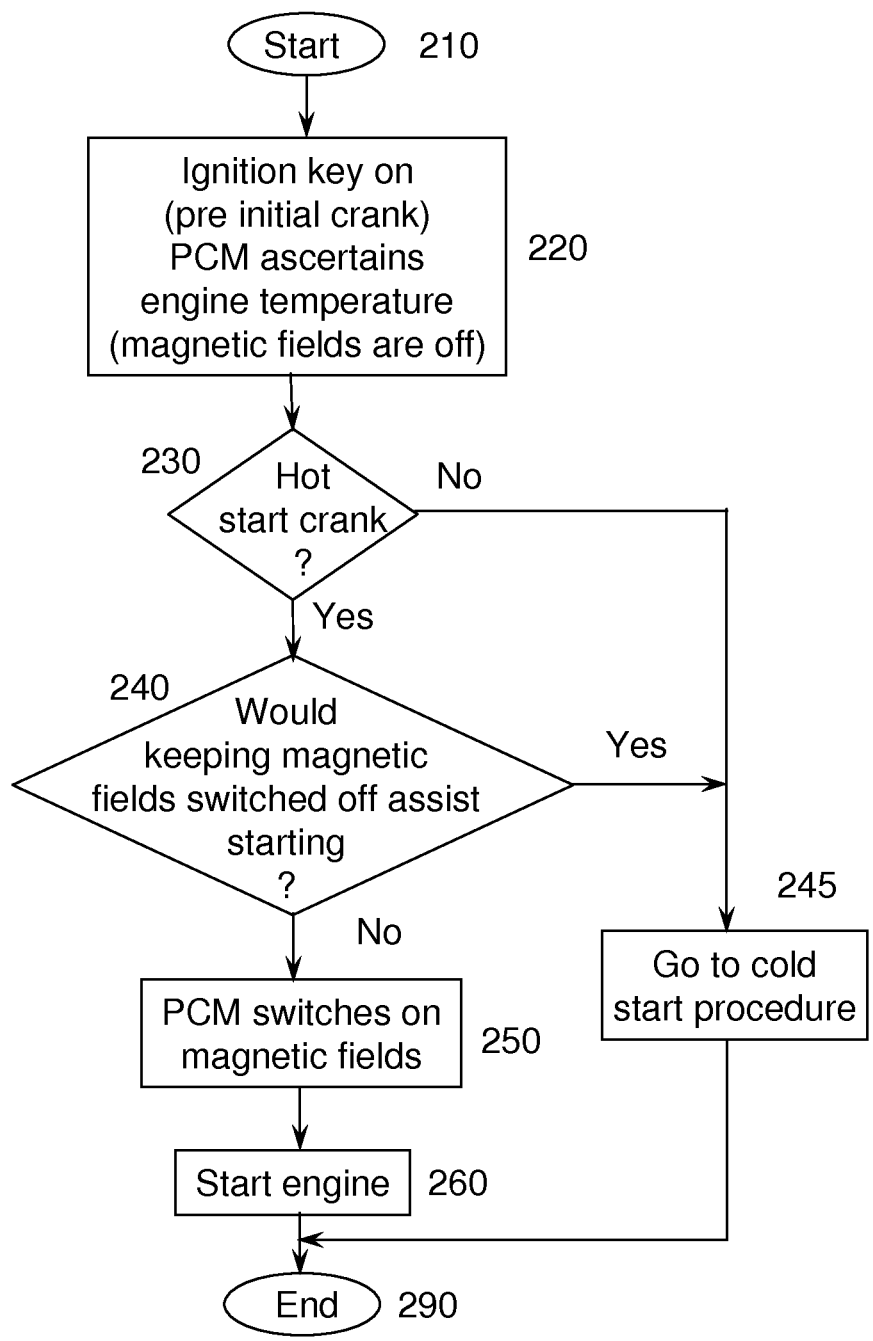
FIG. 3 is a flow chart of a method for operating an engine that can be used in conjunction with the method shown in FIG. 2.

If the temperature is above the first predetermined temperature, control passes to block 190 and (alternatively, control passes to step 240 in FIG. 3). That is to say in this embodiment electromagnets 15a to 15e and 18a to 18e remain off unless a specific instruction to energize them is received by the magnet power control unit 21.

If the temperature of engine 10 is below the first predetermined temperature then the method advances to step 140 where it is confirmed whether the electromagnets 15a to 15e and 18a to 18e are switched off and, if the electromagnets 15a to 15e and 18a to 18e are still switched on from a previous event, then they are switched off.

Then at block 150, engine 10 is started and in block 160 the temperature of engine 10 is continuously monitored. In block 170, which corresponds to blocks 60 and 70 in FIG. 5, when the temperature of engine 10 reaches a second predetermined temperature, which is higher than the first predetermined temperature, controller 20 sends a power on signal to magnet power control unit 21 to switch on the electromagnets 15a to 15e and 18a to 18e. Once engine 20 is at or above the second predetermined temperature, which may be the normal running temperature of engine 10, electromagnets 15a to 15e and 18a to 18e remain switched on until the engine 10 is switched off and is restarted. The starting sequence ends in block 190.

Referring now to FIG. 3, there is shown a further embodiment which after starting at block 210 confirms at a key-on event whether electromagnets 15a to 15e and 18a to 18e are switched off and, if they are not, switches electromagnets 15a to 15e and 18a to 18e off and, in addition, determines the current temperature of engine 10.

In block 230, it is determined whether the engine start is a hot crank event by comparing the current measured temperature with a predetermined temperature value. If the current engine temperature value is below the predetermined temperature value then a cold start procedure such as that set out in FIG. 2 is followed as indicated by block 245. That is to say a 'no' response to the query in block 230 corresponds to a 'yes' response in block 130. If the response to the query at step 230 is 'yes' control passes to block 240 where it is determined whether electromagnets 15a to 15e and 18a to 18e should be kept off thereby keeping the viscosity of the magnetorheological fluid low. If the answer is 'yes', control passes to block 245; and a cold start procedure is followed, as set out in FIG. 2. But, if the answer is 'no', control passes to block 250 where electromagnets 15a to 15e and 18a to 18e are switched on. A 'no' response in block 240 will only result when the temperature of engine 10 is at or above its normal running temperature and the viscosity of the magnetorheological fluid is to be increased to prevent film breakdown. Electromagnets 15a to 15e and 18a to 18e are switched off whenever possible to reduce the power consumed by electromagnets 15a to 15e and 18a to 18e and keep the viscosity of the magnetorheological fluid low whenever possible. Control passes from block 250 to block 260 in which engine 10 is started after which the procedure ends in block 290.

Although the embodiments thus far describe electromagnets 15a to 15e and 18a to 18e either switched 'on' or 'off', it will be appreciated that the strength of the magnetic field produced by electromagnets 15a to 15e and 18a to 18e could be varied based upon the engine operating conditions. That is to say, when engine 10 is running hot under high load a stronger magnetic field could be produced by electromagnets 15a to 15e and 18a to 18e than when engine 10 is hot but operating under low load such as idle. In this way, the viscosity of the magnetorheological fluid could be kept to a minimum at all times thereby maximizing the fuel economy gains.

Similarly, the strength of the magnetic field produced by electromagnets 15a to 15e and 18a to 18e can be non-uniform to tailor it to suit the circumstances. For example, the strength of the magnetic field produced by each of electromagnets 15a to 15e could be controlled to be greater than the magnetic field produced by each of electromagnets 18a to 18e so as to suit the bearing load conditions existing at these different locations or electromagnets 15a to 15e could be controlled such that the magnetic field produced by electromagnets 15a and 15e could be higher than the magnetic field produced by electromagnets 15b, 15c and 15d.

As yet another alternative, each of electromagnets 15a to 15e could be designed to produce a magnetic field that is stronger than the magnetic field produced by each of electromagnets 18a to 18e so that a simple switching 'on' and 'off' of electromagnets 15a to 15e and 18a to 18e will produce differing viscosities in their respective bearings.

Figure 4:
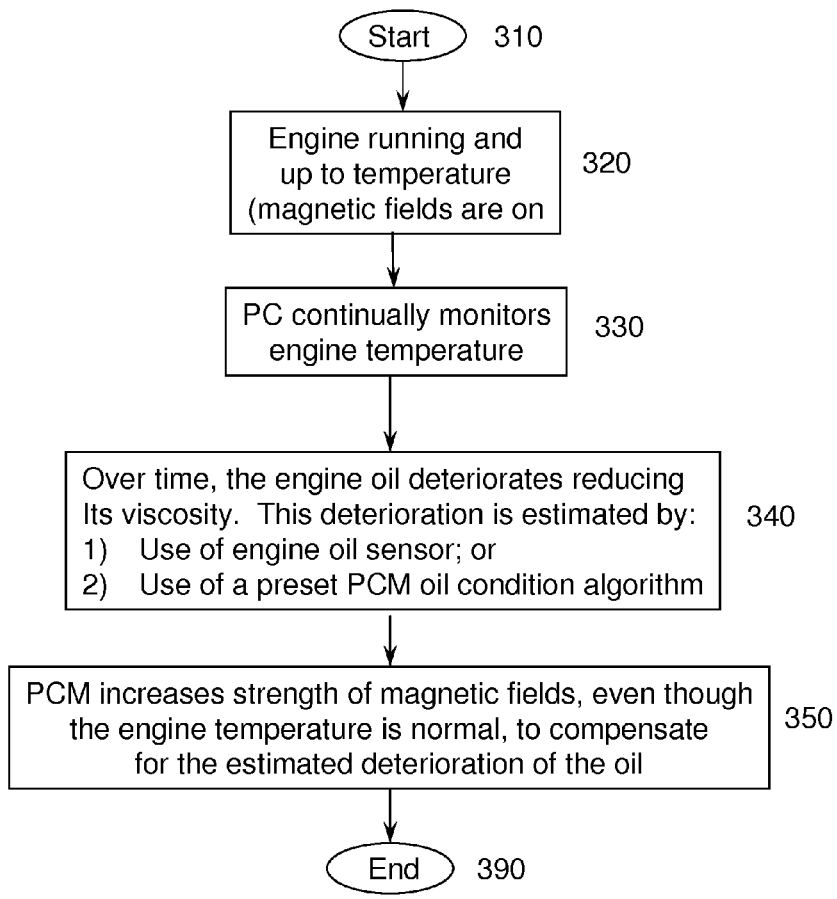
FIG. 4 is a flow chart of a method for varying the strength of a magnetic field used to vary a viscosity of a lubricant that can be used with the methods shown in FIGS. 1 and 2.

Referring now to FIG. 4, there is shown an additional embodiment. Instead of merely switching 'on' and 'off' electromagnets 15a to 15e and 18a to 18e, the strength of the magnetic field supplied by electromagnets 15a to 15e and 18a to 18e can be varied based upon degradation of the magnetorheological fluid. If the magnetorheological fluid is known to become more viscous as it ages, electromagnets 15a to 15e and 18a to 18e can be energized to produce a lower level of magnetic field when engine 10 is up to normal running temperature than when the magnetorheological fluid was new. Alternatively, if the magnetorheological fluid is known to become less viscous as it ages, electromagnets 15a to 15e and 18a to 18e can be energized to produce a higher level of magnetic field when engine 10 is hot than when the magnetorheological fluid was new.

As an alternative, if the magnetorheological fluid is known to become more viscous as it ages, electromagnets 15a to 15e and 18a to 18e can be energized at a higher pre-determined temperature than when the magnetorheological fluid was new. Alternatively, if the magnetorheological fluid is known to become less viscous as it ages, electromagnets 15a to 15e and 18a to 18e can be energized at a lower temperature than when the magnetorheological fluid was new.

Referring to FIG. 4, starting in block 310 and engine 10 is running and up to temperature in block 320, meaning that the magnetic fields are 'on.' In block 330, controller 20 continuously measures the temperature of engine 10. In block 340, the deterioration or degradation of the magnetorheological fluid is determined by the use of a lubricant wear sensor or by the use of an algorithm programmed into controller 20 which uses the duty cycle of engine 10 and the accumulated running of engine 10 to model changes to the viscosity of the magnetorheological fluid. In block 350, the strength of the magnetic field applied to the magnetorheological fluid is increased with increasing engine use to compensate for, in this case, a reduction in viscosity due to degradation. The procedure ends in block 390.

It will be appreciated that if the viscosity of the magnetorheological fluid increases as it ages, then the strength of the magnetic field will be reduced in block 350 with increasing engine use. It will be appreciated that by varying the strength of the magnetic field in this manner the effective life of the magnetorheological fluid before it needs to be replaced can be potentially increased.

In one embodiment, if the magnetorheological fluid is changed or replaced, controller 20 is reset or recalibrated to account for the change in lubricant. This can be done by a service technician using an electronic service tool that is connected to controller 20 or powertrain control module.

One of the advantages of the invention is that the viscosity of the magnetorheological fluid is only increased in the specific locations where it is required to meet bearing demands and at all other locations it remains in a low viscosity state thereby further increasing the fuel economy gains.

Although the engine has been described with respect to a specific type of reciprocating internal combustion engine it will be appreciated that it could be applied to other types of engines.

While the best mode has been described in detail, those familiar with the art will recognize various alternative designs and embodiments within the scope of the following claims. Where one or more embodiments have been described as providing advantages or being preferred over other embodiments and/or over prior art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the disclosure as claimed.

What is claimed is:

1. A method for operating an internal combustion engine, comprising:
   providing a magnetorheological fluid to lubricate the engine;
   applying a magnetic field to the magnetorheological fluid to change the viscosity of the magnetorheological fluid based upon engine operating conditions.

2. The method of claim 1 wherein applying a magnetic field causes viscosity of the magnetorheological fluid to increase.

3. The method of claim 1, further comprising:
   varying the strength of the magnetic field applied to the magnetorheological fluid based upon engine operating conditions.

4. The method of claim 1 wherein engine operating conditions include at least one of a temperature associated with the engine, a rotational speed of the engine, and engine torque.

5. The method of claim 1 wherein applying the magnetic field to the magnetorheological fluid comprises applying a magnetic field to at least one specific location thereby locally changing the viscosity of the magnetorheological fluid.

6. The method of claim 5, further comprising:
   changing the strength of the magnetic field at a first specific location independently of the strength of the magnetic field at a second specific location.

7. The method of claim 1 wherein the engine has a crankshaft rotationally supported by crankshaft main bearings and a camshaft rotationally supported by camshaft bearings, the method further comprising:
   changing the strength of the magnetic field applied to the crankshaft main bearings independently of the strength of the magnetic field at the camshaft bearings.

8. The method of claim 1, further comprising:
   changing the strength of the magnetic field applied to the magnetorheological fluid based upon degradation of the magnetorheological fluid.

9. The method of claim 1, further comprising:
   applying the magnetic field when it is determined that viscosity of the magnetorheological fluid is too low.

10. The method of claim 2, further comprising:
    reducing the magnetic field when it is determined that viscosity of the magnetorheological fluid is too high.

\* \* \* \* \*